Jan. 27, 1931.　　　C. G. GARRARD　　　1,790,538
LOCK NUT
Filed June 30, 1928
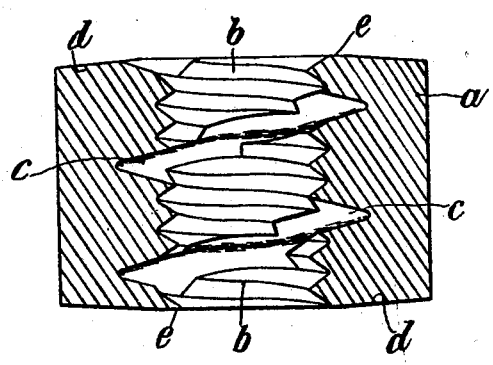
INVENTOR
Charles G. Garrard
BY
ATTORNEY Patented Jan. 27, 1931

1,790,538

UNITED STATES PATENT OFFICE

CHARLES GEORGE GARRARD, OF LONDON, ENGLAND, ASSIGNOR TO EVERTITE LOCK-NUTS LIMITED, OF LONDON, ENGLAND, A BRITISH COMPANY

LOCK NUT

Application filed June 30, 1928, Serial No. 289,507, and in Great Britain July 12, 1927.

This invention relates to locknuts of the kind wherein the locking action depends upon resilient deformation of the nut body produced by relative displacement of parts thereof when the nut is drawn up against the work-piece or abutment. Nuts acting on the above lines and in which relative resilient displacement of threaded portions in the nut provides the locking and is obtained by the provision of an annular groove within the nut, present difficulty in their manufacture especially in small sizes, for example, below half an inch. The part division of such nuts into segmental portions for engaging the work-piece by radial or like slitting of the nut from one end towards the internal annular grooving to provide for more liberal deformation involves a further manufacturing operation and is likewise unsatisfactory.

The object of the present invention is to overcome such disadvantages as the above and in general to provide locknuts both efficient in action and cheap and simple to manufacture.

According to the present invention, the nut is rendered resiliently deformable to effect the locking in the manner above indicated by providing internal substantially helical grooving distinct from the nut thread.

The helical grooving may be of any suitable section and depth and of constant or variable pitch preferably being of opposite hand to the thread and such as to give adequate resilience. The said grooving may extend wholly or partly through the nut and is adapted to leave one or more internal portions capable of relative displacement for causing elastic deformation of the nut under the pressure produced by contact of the end of the latter with the work-piece or abutment. The nut may be bevelled on one or both ends, such bevel extending preferably from a relatively flat portion around the bore convexly to the outer walls of the nut so as to more or less localize the contact pressure on the end regions of the somewhat wedge shaped deformable portions left adjacent the grooving.

To minimize the likelihood of rust, the helical groove may be filled in, wholly or in part, with any suitable soft, plastic material.

In the preferred construction the helical groove extends from end to end of the bore and is of V shape in cross section, and is of considerably greater depth than the thread.

In order that the invention may be better understood, it will now be described with reference to the accompanying drawing, the single figure of which shews a sectional elevation of a preferred form of nut constructed according to the invention and in which $a$ is the body of the nut which is formed with a bore having an ordinary thread $b$. In addition the nut is also formed with a helical groove $c$ which extends from end to end of the bore and is of V shape in cross section. The helical groove $c$ is of desired pitch and as shewn on the drawing is of the opposite hand to the thread in the nut; moreover the groove $c$ is of considerably greater depth than the depth of the thread.

The ends of the nut are bevelled at $d$ in a convex manner and this convex bevelling extends from the walls of the nut to a flat portion $e$ around the bore. In some cases only one end of the nut need be bevelled and although it is preferred to use a flat portion such as $e$ in connection with the bevelled end or ends, in some cases the flat portion or portions may be dispensed with.

The helical groove may be of any other section, as for instance channel section, U shape, semicircular or of any other suitable form.

Locknuts constructed according to the invention can be made in small sizes, for example the invention may be successfully applied to nuts having a bore of one half an inch diameter downwards.

Successful results have been obtained in practice with a ⅜" standard B. S. F. nut of mild steel of a tensile strength of about 30 tons per square inch with the invention applied thereto, a single helical groove being employed of the opposite hand to the thread, having a pitch of ⅛", of V shape in cross section, the angle at the apex of the V being 35 degrees and the depth of the V being twice the depth of the thread, the nut having one end only bevelled, the angle of the bevel being 15 degrees to the horizontal.

With nuts constructed according to the invention, owing to the provision of the helical groove, a certain clamping action is produced between the threads of the nuts and the threads of the bolt, due to the bevelled end screwing down upon the work piece and causing the elastic deformation between the groove and separated threaded parts, attributed to the transmission of the pressure through the material of the nut.

Having now particularly described and ascertained the nature of my said invention and in what manner the same is to be performed, I declare that what I claim is:—

1. A lock nut of the kind wherein the locking is obtained by resilient or elastic deformation when the nut is screwed up against the work-piece or abutment, in which internal parts of the nut body adapted to become relatively displaced to provide such deformation are formed by providing internal substantially helical grooving distinct from the nut thread.

2. A lock nut according to claim 1 having the grooving deeper than the screw thread.

3. A lock nut according to claim 1 in which the nut body is provided with helical grooving having relatively displaceable screwed parts therewithin, the helical grooving being of opposite hand to the nut thread.

4. A lock nut according to claim 1 in which the nut body is provided with helical grooving having relatively displaceable screwed parts therewithin, the helical grooving being of opposite hand to the nut thread, said grooving extending throughout the length of the nut.

5. A lock nut according to claim 1 wherein at least one end face of the nut is bevelled, such bevel extending from a relatively flat portion around the bore convexly to the outer walls of the nut.

6. A lock nut according to claim 1 in which the helical grooving is of V shape in cross section and of considerably greater depth than the nut thread.

7. A lock nut comprising an internally threaded body, having an internal substantially helical grooving distinct from the nut thread providing elastic deformable portions throughout the length of said body, and said body having a convex bevelled work-engaging end face whereby said grooving will be deformed upon forcible engagement with a work-piece.

8. As a new article of manufacture a lock nut, having a threaded bore, convex ends, and a helical V-shaped groove in the bore and extending the length thereof, the groove being of opposite hand to the threads of the nut and of a depth about twice the depth of said threads.

In witness whereof I affix my signature.

CHARLES GEORGE GARRARD.